United States Patent [19]
Chang

[11] Patent Number: 5,833,331
[45] Date of Patent: Nov. 10, 1998

[54] COMPACT DISK STORAGE BOX ASSOCIATED WITH A FRONT PANEL OF A COMPUTER CASE

[76] Inventor: I-Chen Chang, 2F, No. 41, Maan-Pyng St., Pan-Chyau Shih, Taipei Hsien, Taiwan

[21] Appl. No.: 828,678

[22] Filed: Mar. 31, 1997

[51] Int. Cl.[6] .................................................. A47B 97/00
[52] U.S. Cl. .................... 312/223.2; 312/9.21; 312/9.57; 361/724
[58] Field of Search .................................. 312/9.21, 9.22, 312/9.17, 9.16, 9.11, 9.9, 9.57, 9.51, 9.47, 9.48, 350, 293.1, 293.3, 265.6, 223.2; 206/309, 308.1; 361/724, 686; 211/40, 41.1

[56] References Cited

U.S. PATENT DOCUMENTS

| | | | |
|---|---|---|---|
| 3,969,007 | 7/1976 | Lowry | 312/9.21 |
| 4,678,245 | 7/1987 | Fouassier | 312/9.22 |
| 5,138,525 | 8/1992 | Rodriguez | 361/724 X |
| 5,175,670 | 12/1992 | Wang | 361/724 X |
| 5,183,177 | 2/1993 | Yu | 312/9.21 X |
| 5,393,135 | 2/1995 | Tisbo et al. | 312/9.57 X |
| 5,399,398 | 3/1995 | Toshimitsu et al. | 211/41.1 X |
| 5,447,367 | 9/1995 | Wei | 312/223.2 |
| 5,542,757 | 8/1996 | Chang | 312/223.2 |
| 5,549,375 | 8/1996 | Pagliaccio | 312/223.2 X |
| 5,645,329 | 7/1997 | Madock | 312/9.11 X |

*Primary Examiner*—Peter M. Cuomo
*Assistant Examiner*—James O. Hansen
*Attorney, Agent, or Firm*—Bacon & Thomas

[57] ABSTRACT

A compact disk storage box associated with a front panel of a computer case has top and bottom plates of the same configuration, two opposed side plates, and a back plate to constitute a box with an opening at the front. The side plates are equipped with a plurality of opposed rails on the internal surface to guide inserted compact disk trays. One of side plates is provided on the front edge with a vertical row of spaced end buttons each of which has a free end so that when a compact disk tray is pushed into the box, the tray urges inwardly a resilient ejector arranged on the back plate until it is caught by an end button. Users can move the end button sideways to release the tray for storage or retrieval of a compact disk. The box can be accommodated inside the lower portion of a computer case and combined with the case.

6 Claims, 7 Drawing Sheets

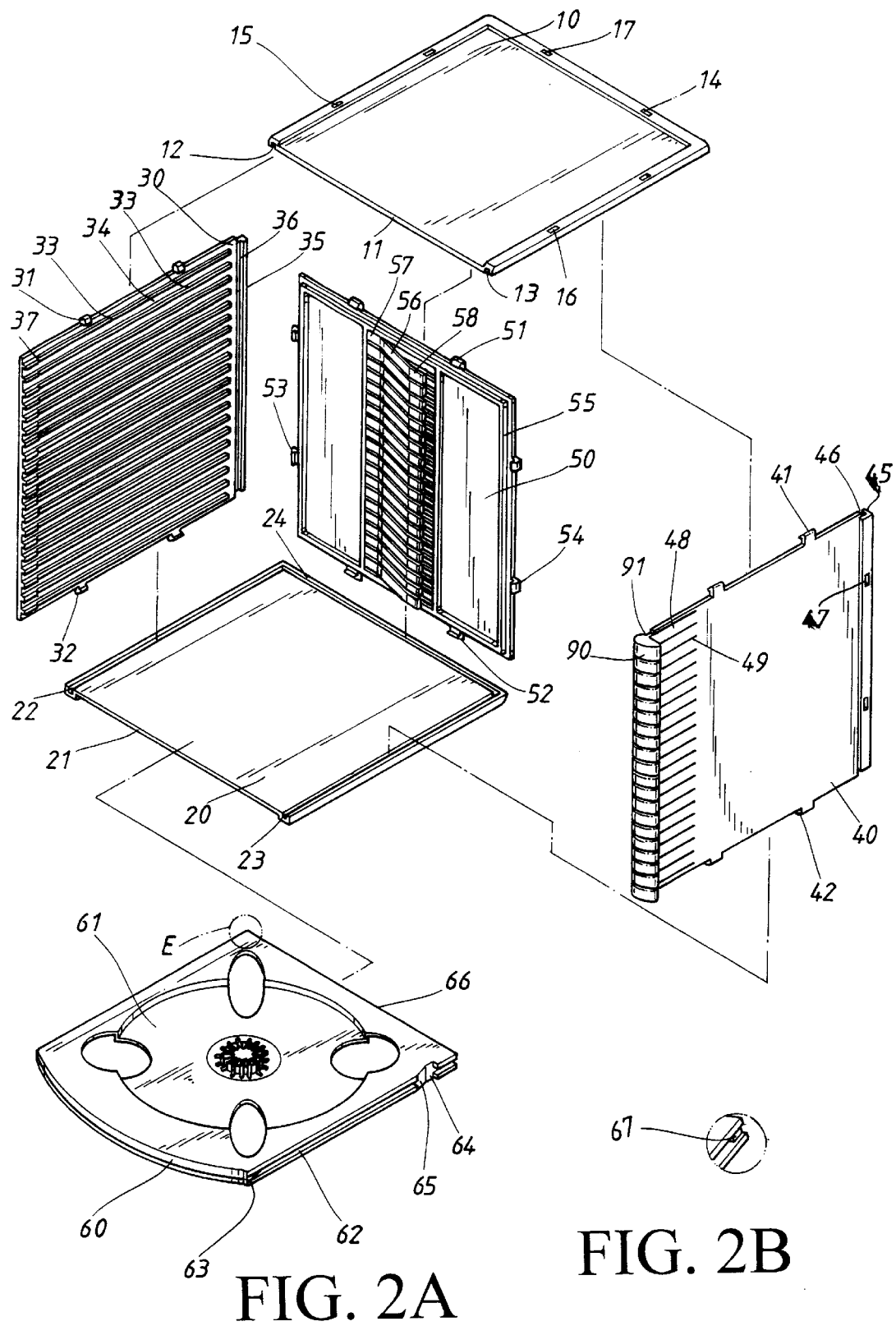

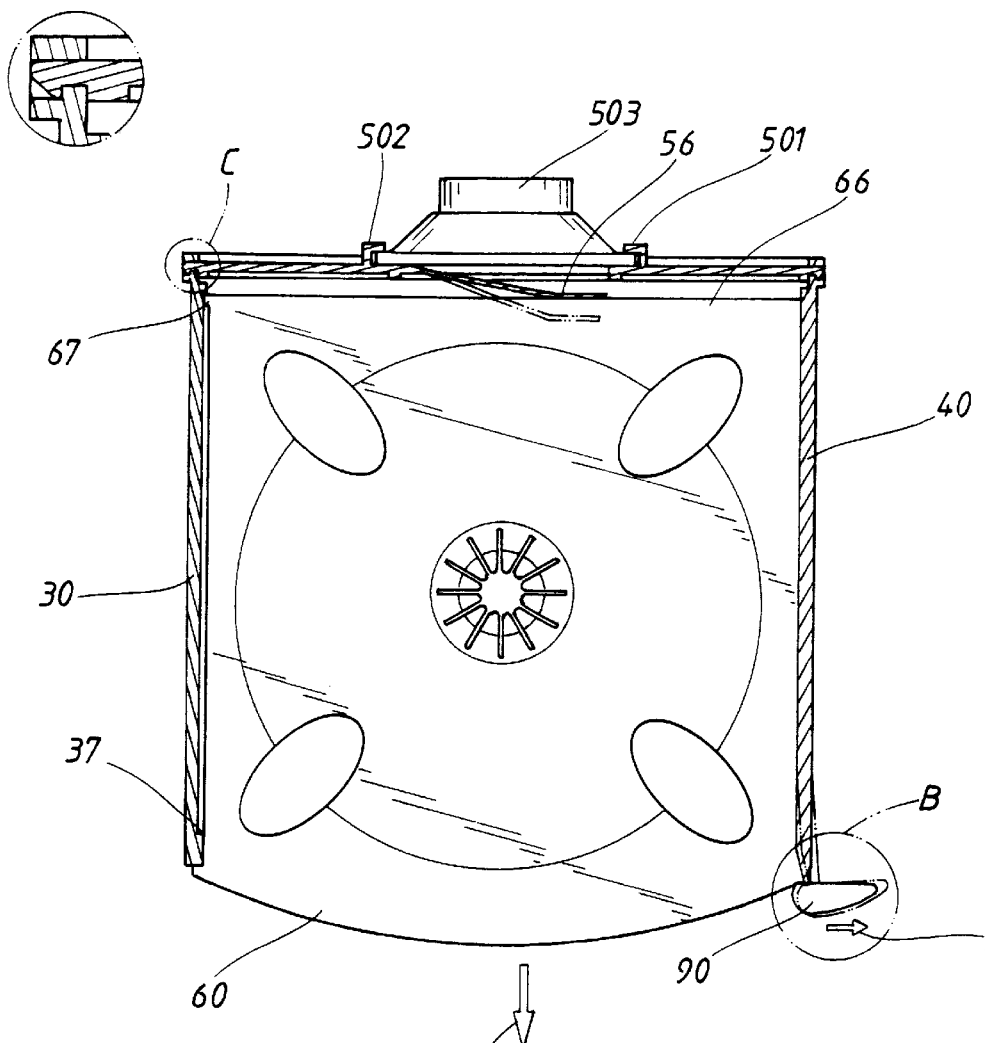
FIG. 3C
FIG. 3A
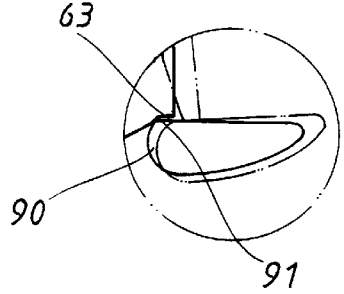
FIG. 3B

COMPACT DISK STORAGE BOX ASSOCIATED WITH A FRONT PANEL OF A COMPUTER CASE

BACKGROUND OF THE INVENTION

The invention relates to a compact disk storage box associated with a front panel of a computer case that can be either independently used as a storage box or incorporated into a computer case in a lower portion to serve as an accessory storage cabinet, providing convenience in retrieval of compact disks.

Because the storage capacity of a compact disk is much more than a conventional floppy disk, recently compact disks have gradually become a major medium for data storage.

However, a compact disk is vulnerable and sensitive to abrasive and scratches. How to protect compact disks from potential damages while allowing an easy-to-retrieve feature is an important factor in the design of a storage structure. Most of compact disk storage boxes on the market are independent cases. They take more space and are not convenient in transportation and storage.

Additionally conventional storage boxes are designed for the storage of audio or video compact disks and not suitable for floppy disks used in a computer. These storage boxes take considerable space themselves and their position on a working table must avoid interference with the operation of other peripheral equipment. Thus it is desirable to have a storage structure in which the above drawbacks are eliminated.

SUMMARY OF THE INVENTION

Accordingly, the primary object of the invention is to provide a storage box associated with a front panel of a computer case that comprises opposite top and bottom plates, left and right side plates, and a back plate. The upper and lower edges of side plates and the back plate are in engagement with the side edges of the top and bottom plates. A vertical row of resilient blades is arranged in the middle segment of the back plate and opposite rails are formed on the inner surfaces of side plates to guide compact disk trays. Consequently an inserted compact disk tray will press against a resilient blade by the rear edge and the front end of the tray is detained by an end button. Users can make a desired compact disk tray pop up for the retrieval and placement of compact disks by moving the end button.

A further object of the invention is to provide a compact disk storage box associated with a front panel of a computer case, especially a storage box that can be housed inside the lower portion of a computer case and users can pull out a compact disk tray for the retrieval and placement of compact disks by depressing an end button, providing convenience in use and minimizing the storage space of compact disks.

BRIEF DESCRIPTION OF ACCOMPANYING DRAWINGS

The major features and novelty of the invention will be become apparent from the following detailed description of preferred embodiments when read in conjunction with the accompanying drawings, in which:

FIG. 2 is an exploded view of the compact disk storage box of FIG. 1;

FIG. 2A is an enlarged view of the retainer block;

FIG. 2B is an enlarged view of area E in FIG. 2A.

FIGS. 3A, 3B and 3C are cross sectional views illustrating the positioning of a compact disk tray in the storage box;

FIGS. 3B and 3C are enlarged views of areas B and C, respectively, in FIG. 3A.

FIG. 4B is an enlarged view of area D in FIG. 4A.

DETAILED DESCRIPTION OF EMBODIMENTS OF THE INVENTION

Figure 1:
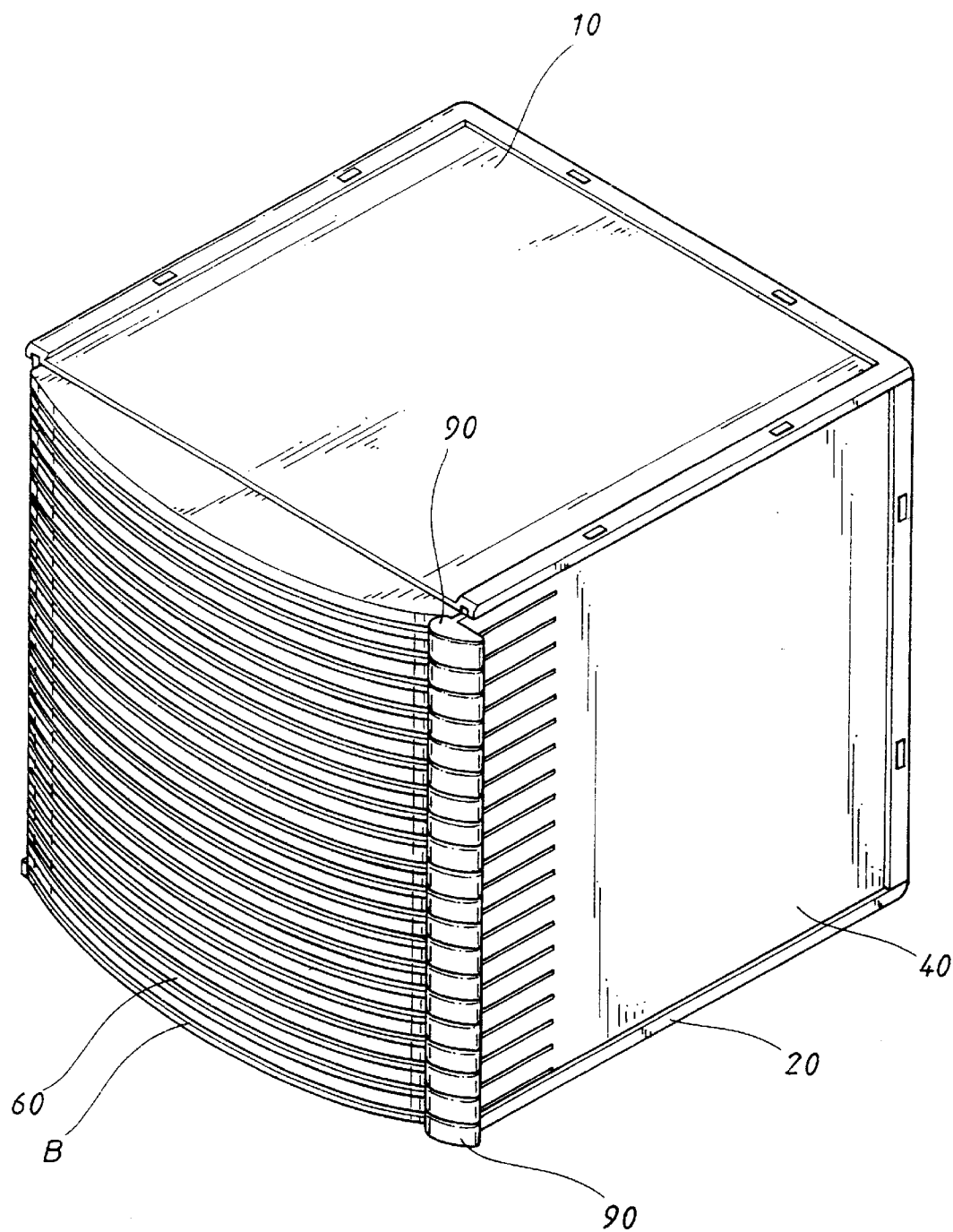
FIG. 1 is a perspective view showing the practice of the present invention.

With reference to FIGS. 1 and 2 the invention generally comprises a top and a bottom plate 10 and 20, a left side and a right side plate 30 and 40, and a back plate 50 to form a box with an opening at the front.

The top and the bottom plates 10 and 20 are configured to be of the same shape and have U-shaped grooves 12, 13, 14, 22, 23, 24 on all periphery but the front edges 11 and 21. In addition, the U-shaped grooves 12, 13, 14, 22, 23, 24 are respectively provided with engagement openings 15, 16, 17. On the accompanying drawings, the engagement openings formed in the U-shaped grooves 22, 23, and 24 of the bottom plate 20 are invisible due to the view angle and thus they are not identified by reference numbers.

Left side and right side plates are designed to have a thickness fit for their insertion into the U-shaped grooves 12, 13, 14, 22, 23, and 24 and provided with lock fingers 31, 32, 41, 42 on upper and lower edges. These lock fingers extend into the engagement openings 15, 16, and 17 when side plates are installed onto top and bottom plates to keep them together. Side plates 30 and 40 include a plurality of rails 33 (rails on the side plate 40 not shown) on their surfaces to form a channel 34 between adjacent rails and comprise grooves 36 and 46 defined by angled edges 35 and 45 at the rear rims. There are engagement openings 47 arranged in the grooves 36 and 46. In the preferred embodiment the rails 33 are respectively provided with a stop 37 at the front ends. The right side plates 40 are different from the left side plates 30 in a plurality of end buttons 90 arranged in a vertical line on the front edges of right side plates. Each end button 90 is accompanied by two gaps 49 respectively horizontally extending into the side plate 40 along two sides of the end button 90 to form an overhung blade 48. These end buttons 90 are designed to have an ergonomic configuration with a shoulder portion 91 to provide convenience in depression by fingers.

The back plate 50 has such a thickness that it can be snugly accommodated in the U-shaped grooves of the foregoing constituent plates of the storage box. Lock fingers 51, 52, 53, and 54 are provided on the side edges of the back plate 50 and low raised wails 55 are disposed in inner positions to confine the contact zones of the back plate with side plates. Distributed in the middle segment of the back plate 50 are a row of resilient ejectors 56 of which one end is connected to the back plate and the other end 58 rises in the air.

As shown in the drawings, the compact disk tray 60 is furnished with a recessed portion 61 for holding a compact disk. The tray 60 has a groove 62 provided on two side ends in order to slide on the opposite rails 33 of side plates 30 and 40. In the preferred embodiment, the compact disk tray 60 includes a shoulder 63 at the front of a side edge and a cut 64 on the rear end. The cut includes an inclined surface 65. Corresponding to the stop 37 of the rail 33, the groove provided on the side end of the compact disk tray 60 opposed to the cut 64 has a retainer block 67 near the rear end.

The storage box is made by separately extending the lock fingers 32 and 42 of the side plates 30 and 40 and the lock fingers 52 of the back plate 50 into the engagement openings of the grooves 22 and 23 of the bottom plate 20 and inserting the lock fingers 31, 41, and 51 into the engagement openings 15, 16, and 17 of the grooves 12, 13, and 14 of the top plate 10.

With reference to FIGS. 3A, 3B and 3C, when a compact disk tray 60 is put into the interior of the box, the rear edge of the tray inwardly urges the resilient ejectors 56 of the back plate 50 until the shoulder 63 abuts against the shoulder portion 91 of an end button 90 so that the compact disk trays 60 can be aligned in a vertical line as shown in FIG. 1.

When users want to retrieve a compact disk, slightly outwardly move the end button 90 in the direction indicated by an arrow head A in FIG. 3 in order that the shoulder portion 91 disengages from the shoulder 63 of the compact disk tray 60. Then the restrained resilient ejectors 56 are released and forward push the compact disk tray 60 along the direction of the arrow head B shown in FIG. 3. Due to a cut 64 formed on the side edge near the rear end, the tray 60, after moving for a predetermined distance, reaches a position where the back sprung end button 90 falls into the cut 64 and detains the tray in place for facilitating the placement and retrieval of compact disks. On the other hand, when the compact disk tray 60 is pushed inwardly, the inclined surface 65 of the cut 64 outwardly urges the end button 90 to allow the compact disk tray 60 to enter into the box. From the above description the compact disk trays 60 jut beyond the edges of the box a preset distance and are kept from dropping out of the box by the cut 64. In addition, the stop notch on the front end of the rails 33 cooperates with the retainer block 67 to keep the tray in a forward direction in order that the compact disk tray will not drop out of the box due to an oblique position.

Figure 5:
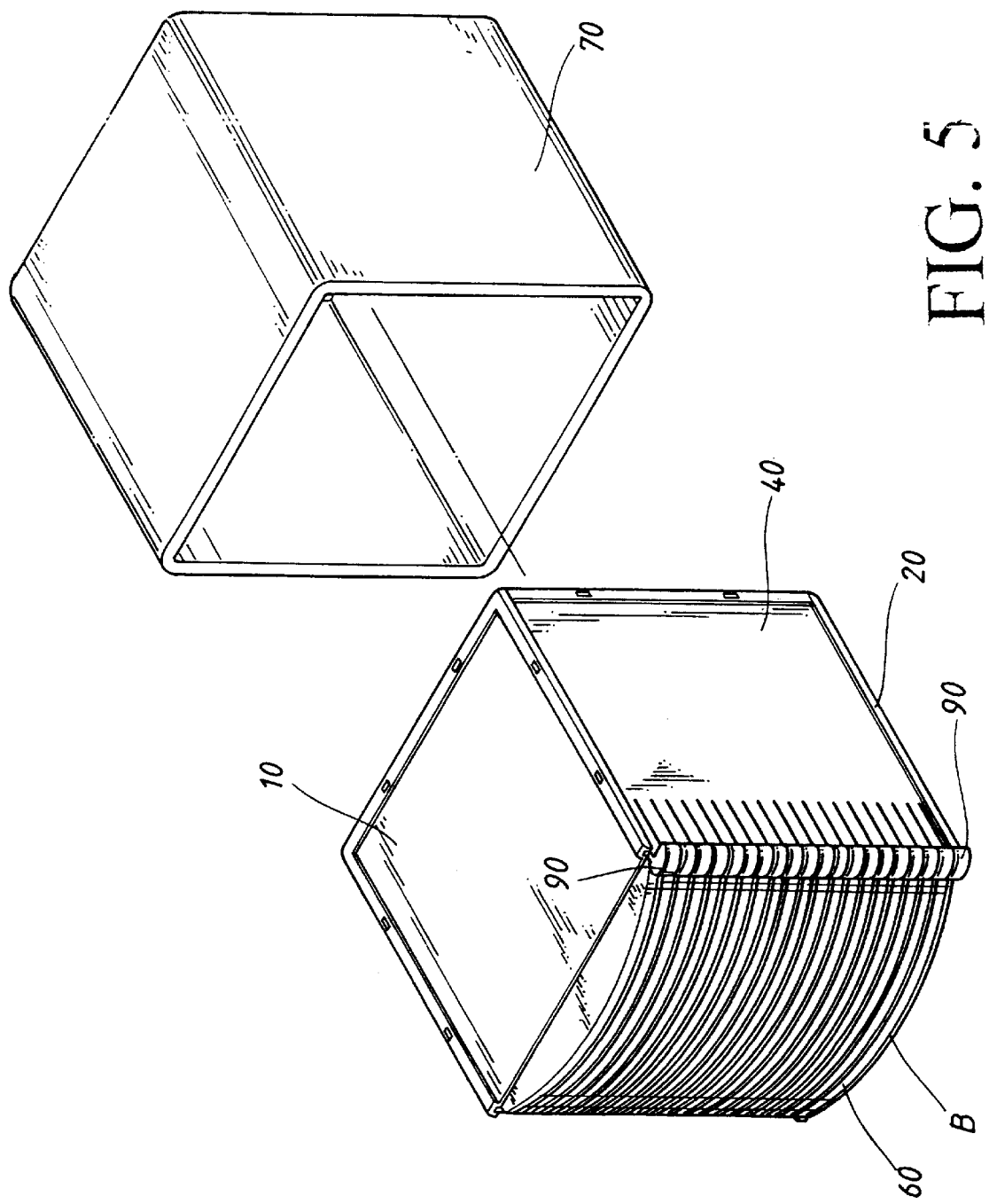
FIG. 5 is a perspective schematic view showing the placement of the storage box inside a case.

FIG. 5 shows another example of the practice of the invention. In this case, the compact disk storage box is housed inside an enclosure 70 having an aesthetic appearance.

Figure 6:
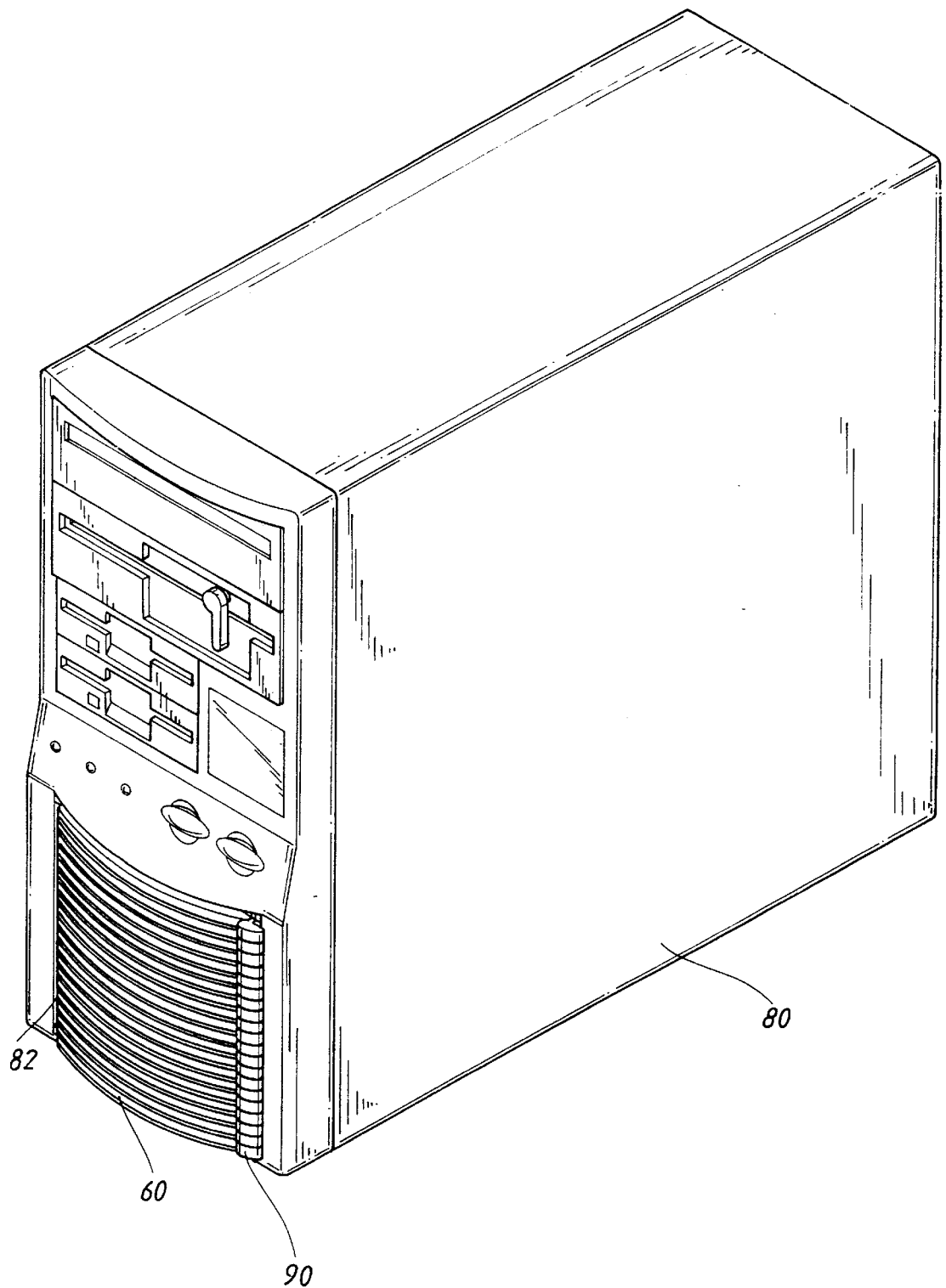
FIG. 6 is a perspective view showing the outer appearance of a computer case incorporating a storage box according to the invention.
Figure 7:
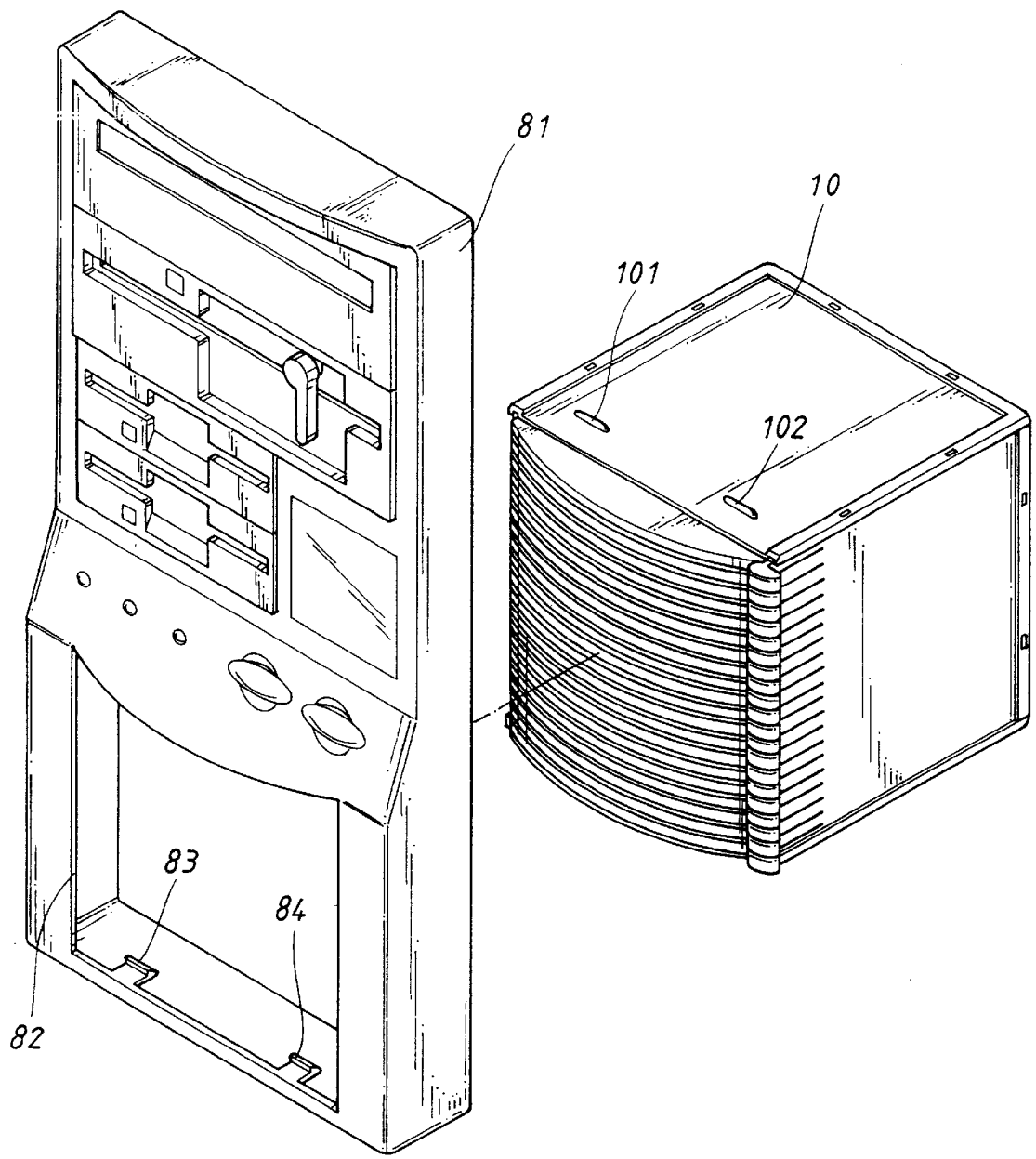
FIG. 7 is an exploded view explaining the association of a storage box of FIG. 6 with a computer case.

As can be seen from FIGS. 6 and 7, the box of the invention is adaptable to the association with a front panel 81 of a computer case 80 and can be housed inside a compartment in the lower portion of the computer case. The front panel 81 is provided in the lower portion with an opening 82 sized to receive a box in order that the storage box can pass through the opening 82. In the illustrative embodiment, the top and the bottom plates 10 and 20 include raised blocks 101 and 102 that cooperate with corresponding slots 83 and 84 formed on the opening 82 to locate the storage box.

Figures 4A, 4B:
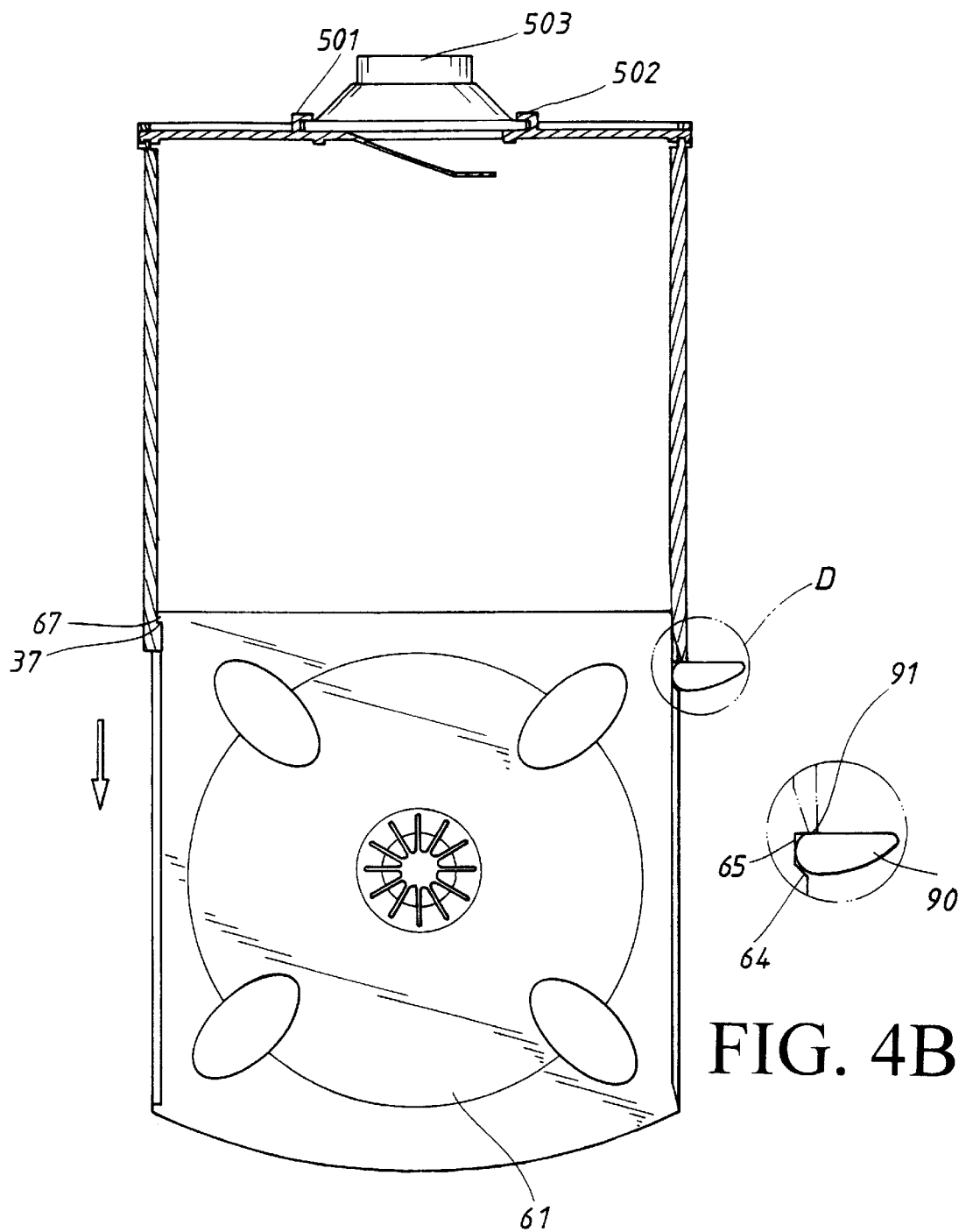
FIGS. 4A and 4B are cross sectional views depicting an ejected compact disk tray.

In a conventional computer structure, there is no component arranged in the lower portion of the front panel. The invention efficiently uses the space to preserve compact disks. Additionally, for a computer system having speakers, the back plate 50 is integrated with angled grooves 501 and 502 molded on the back surface thereof to hold a speaker 503 as shown in FIGS. 3 and 4.

According to the present invention, an independent storage box can be operated by actuating an end button to pop a compact disk tray or inwardly pushing a compact disk tray to lock it in position. Furthermore, the entire box can be housed inside a computer case to become an accessory to the computer system in order to provide convenience in the use of compact disks. Evidently the invention is valuable in the industry.

What is claimed is:

1. A compact disk storage box comprising top and bottom plates of the same configuration, first and second opposed side plates, and a back plate to constitute a box with an opening at a front;

said first and second side plates including a plurality of opposed rails on internal surfaces, the rails on the first side each having a stop adjacent to a front thereof, and the second side plate being provided on a front edge thereof with a vertical row of spaced end buttons each of which has a shoulder and connects with a overhung blade that is bounded by a gap horizontally extending along each side edge of the overhung blade;

said back plate being provided in a middle segment with a vertical row of resilient ejectors one end of which attaches to the back plate and another end angularly rises from the back plate;

and, at least one compact disk tray slidably located on said first and second opposed rails the compact disk tray having a circular recessed portion for holding a compact disk, a cut adjacent to a rear end a shoulder at a front end of a side edge opposite to the side edge on which the end button is provided, and a retainer block on a rear portion of a side edge located so as to engage the stop on a corresponding first side rail to prevent removal of the at least one compact disk tray from the storage box.

2. The compact disk storage box as claimed in claim 1, wherein said top and bottom plates each have first U-shaped grooves located on all periphery edges but a front edge and said side plates have second U-shaped grooves formed on a rear edge;

said first and second U-shaped grooves being respectively provided with engagement openings, and said side plates and said back plates each having lock fingers disposed on side edges of said plates engaging the engagement openings.

3. The compact disk storage box as claimed in claim 2, wherein said back plate includes low raised walls along a periphery in a position away from the boundary thereof to define a contact zone of the back plate with said side plates.

4. The compact disk storage box as claimed in claim 1 wherein said cut formed on said compact disk tray is provided with an inclined guide surface.

5. The compact disk storage box as claimed in claim 1, further comprising a computer case wherein said storage box is placed into a space provided inside the computer case in a lower portion thereof and communicates with an opening formed in a front panel of the computer case.

6. The compact disk storage box as claimed in claim 5 wherein the top and bottom plates of said box have raised blocks that cooperate with corresponding slots formed adjacent to the opening of the front panel to locate the storage box.

\* \* \* \* \*